US012639836B2

(12) United States Patent
Shan et al.

(10) Patent No.: US 12,639,836 B2
(45) Date of Patent: May 26, 2026

(54) SYSTEM AND METHOD FOR ENHANCED ANNOTATION OF FARAWAY OBJECTS BASED ON ROADSIDE SENSORS

(71) Applicant: Black Sesame Technologies Inc., San Jose, CA (US)

(72) Inventors: Jizhang Shan, Los Gatos, CA (US); Qun Gu, San Jose, CA (US); Mingrui Qi, San Jose, CA (US); Yecheng Lyu, Santa Clara, CA (US); Lei Zhang, Santa Clara, CA (US)

(73) Assignee: BLACK SESAME TECHNOLOGIES INC., San Jose, CA (US)

( * ) Notice: Subject to any disclaimer, the term of this patent is extended or adjusted under 35 U.S.C. 154(b) by 248 days.

(21) Appl. No.: 18/435,606

(22) Filed: Feb. 7, 2024

(65) Prior Publication Data
US 2025/0252585 A1     Aug. 7, 2025

(51) Int. Cl.
*G06T 7/33*          (2017.01)
*G06T 7/73*          (2017.01)
(Continued)

(52) U.S. Cl.
CPC ............... *G06T 7/337* (2017.01); *G06T 7/74* (2017.01); *G06V 10/774* (2022.01);
(Continued)

(58) Field of Classification Search
CPC . G06T 7/337; G06T 7/74; G06T 2207/20081; G06T 2207/30236;
(Continued)

(56) References Cited

U.S. PATENT DOCUMENTS

| | | | | |
|---|---|---|---|---|
| 11,698,272 B2 * | 7/2023 | Kroepfl | ................ | G01S 13/865 |
| | | | | 701/409 |
| 12,100,220 B2 * | 9/2024 | Qi | ........................ | G06F 18/213 |

(Continued)

FOREIGN PATENT DOCUMENTS

| | | | | | |
|---|---|---|---|---|---|
| GB | 2618936 A | * | 11/2023 | .............. | G01S 7/40 |
| GB | 2621048 A | * | 1/2024 | ............. | G06F 18/00 |
| WO | WO-2022141912 A1 | * | 7/2022 | .............. | G01S 7/40 |

*Primary Examiner* — Atiba O Fitzpatrick
(74) *Attorney, Agent, or Firm* — Shun Yao; Yao Legal Services, Inc.

(57)          ABSTRACT

Embodiments can provide a data-collection system for collecting training data for autonomous driving applications. The system can include an on-vehicle light-detection-and-ranging (lidar) unit mounted on a data-collection vehicle, a roadside lidar unit, a frame-alignment subsystem, and a frame-superimposing subsystem. The on-vehicle lidar unit is to collect a first stream of frames while the data-collection vehicle is in motion. The roadside lidar unit is to collect, while remaining stationary, a second stream of frames. The frame-alignment subsystem is to align the second stream of frames collected by the roadside lidar to the first stream of frames collected by the on-vehicle lidar in time and spatial domains. The frame superimposing subsystem is to superimpose a frame from the second stream of frames onto a corresponding frame from the first stream of frames, thereby facilitating enhancement of point clouds of objects in the first stream of frames.

16 Claims, 6 Drawing Sheets

(51) Int. Cl.
　*G06V 10/774*　　　(2022.01)
　*G08G 1/01*　　　　(2006.01)
(52) U.S. Cl.
　CPC ......... *G08G 1/0112* (2013.01); *G08G 1/0116*
　　(2013.01); *G06T 2207/20081* (2013.01); *G06T*
　　　　　　　　　　　　　*2207/30236* (2013.01)
(58) Field of Classification Search
　CPC ... G06T 5/50; G06T 5/60; G06T 2207/10016;
　　　　G06T 2207/10028; G06T 2207/10044;
　　　　G06T 2207/20172; G06T 2207/30244;
　　　　　　　G06T 2207/30252; G06T
　　　　2207/30248–30264; G06T 7/30–38; G06T
　　　　7/70–77; G06T 2207/20212–20221; G06T
　　　　　3/4038; G08G 1/0112; G08G 1/0116;
　　　　G01S 7/4802; G01S 17/86; G01S 17/89;
　　　　G01S 17/931; G01S 19/42; G01S 17/88;
　　　　G01S 17/00; G06V 10/16; G06V 10/26;
　　　　G06V 20/54; G06V 20/56; G06V 20/70;
　　　　G06V 10/774–7753; G06N 3/08–0985;
　　　　G06F 18/214–2155; G06F 7/023; G06F
　　　　　　　　　　　　　　　　　　40/16
　See application file for complete search history.

(56) References Cited

U.S. PATENT DOCUMENTS

| | | | |
|---|---|---|---|
| 2022/0092291 A1* | 3/2022 | Lai ........................... | G01S 17/42 |
| 2023/0168382 A1* | 6/2023 | Steinberg ................ | G01S 17/86 |
| | | | 356/4.01 |
| 2024/0095928 A1* | 3/2024 | Wang ........................ | G06T 7/80 |
| 2025/0028034 A1* | 1/2025 | Yan ......................... | G01S 17/89 |

\* cited by examiner

SYSTEM AND METHOD FOR ENHANCED ANNOTATION OF FARAWAY OBJECTS BASED ON ROADSIDE SENSORS

BACKGROUND

Field

The present disclosure is generally related to collecting training data for autonomous driving. More specifically, the present disclosure is related to using measurement from roadside sensors to enhance annotations of data on faraway objects.

RELATED ART

The training of an autonomous driving system typically involves the collection of a vast amount of real-world traffic data. In a typical scenario, data-collection vehicles can be equipped with various sensors (e.g., cameras, light-detection-and-ranging (lidar) units, radars, Global Positioning System (GPS) modules, etc.) that can continuously collect data during real-world driving scenarios. More specifically, as the data-collection vehicles are driving under different traffic and weather conditions, these on-vehicle sensors can capture information about the surroundings.

The collected information (e.g., images, 3D point clouds, meshes, etc.) can be annotated automatically by algorithms or manually by human annotators and then used as training data to train autonomous driving systems. For example, an algorithm or human annotator can identify and label objects (e.g., vehicles, traffic lights/signs, pedestrians, etc.) in images or lidar frames. The labeled images or lidar frames can then be used as training data for supervised training of machine learning models used for object detection and object tracking. However, small or faraway objects (e.g., vehicles or pedestrians) in a traffic scene may be heavily occluded by closer objects or have too few sampling points in the 3D point cloud, which makes it difficult to annotate such small or faraway objects.

SUMMARY

Embodiments of this disclosure can provide a data-collection system for collecting training data for autonomous driving applications. The data-collection system can include an on-vehicle light-detection-and-ranging (lidar) unit mounted on a data-collection vehicle, a roadside lidar unit, a frame-alignment subsystem, and a frame-superimposing subsystem. The on-vehicle lidar unit is to collect a first continuous stream of frames while the data-collection vehicle is in motion. The roadside lidar unit is to collect, while remaining stationary, a second stream of frames. The frame-alignment subsystem is to align the second stream of frames collected by the roadside lidar to the first stream of frames collected by the on-vehicle lidar in time and spatial domains. The frame superimposing subsystem is to superimpose a frame from the second stream of frames onto a corresponding frame from the first stream of frames, thereby facilitating enhancement of point clouds of objects in the first stream of frames.

In a variation on this embodiment, the data-collection system can further include a synchronization subsystem to synchronize operations of the on-vehicle lidar unit and the roadside lidar unit.

In a further variation, the synchronization subsystem can include a high-precision Global Positioning System (GPS) module.

In a variation on this embodiment, the data-collection system can further include a pose-determination subsystem to determine a pose of the on-vehicle lidar unit associated with each frame of the first stream of frames and a pose of the roadside lidar unit.

In a further variation, the data-collection system can further include a frame preprocessing subsystem to preprocess a frame by removing transitory objects from the frame.

In a further variation, the pose-determination subsystem can determine the pose of the on-vehicle lidar unit associated with a frame by aligning, in the spatial domain, the preprocessed frame to a reference frame; and the pose-determination subsystem can determine the pose of the roadside lidar unit by aligning, in the spatial domain, a frame selected from the second stream of frames to the reference frame.

In a further variation, the frame-alignment subsystem is to select a frame from the first stream of frames, identify a frame from the second stream of frames that is aligned to the selected frame in time, and align, in the spatial domain, the identified frame to the selected frame based on the pose of the on-vehicle lidar unit associated with the selected frame and the pose of the roadside lidar unit.

In a further variation, aligning, in the spatial domain, the preprocessed frame to the reference frame can include applying an Iterative Closest Point (ICP) algorithm or obtaining high-precision GPS information associated with the on-vehicle lidar unit and the roadside lidar unit.

In a further variation, the data-collection system can further include a map-construction subsystem to construct a high-precision map by superimposing preprocessed frames from the first stream of frames collected by the on-vehicle lidar.

In a variation on this embodiment, the roadside lidar is to collect the second stream of frames from an elevated viewing angle.

One embodiment can provide a method for collecting training data for autonomous driving applications. The method can include: obtaining a first stream of frames from an on-vehicle light-detection-and-ranging (lidar) unit mounted on a data-collection vehicle; obtaining a second stream of frames from a roadside lidar unit; aligning the second stream of frames collected by the roadside lidar to the first stream of frames collected by the on-vehicle lidar in time and spatial domains; and superimposing a frame from the second stream of frames onto a corresponding frame from the first stream of frames, thereby facilitating enhancement of point clouds of objects in the first stream of frames.

DESCRIPTION OF THE FIGURES

In the figures, like reference numerals refer to the same figure elements.

DETAILED DESCRIPTION

The following description is presented to enable any person skilled in the art to make and use the disclosed embodiments and is provided in the context of one or more particular applications and their requirements. Various modifications to the disclosed embodiments will be readily apparent to those skilled in the art, and the general principles defined herein may be applied to other embodiments and applications without departing from the scope of those that are disclosed. Thus, the present invention or inventions are not intended to be limited to the embodiments shown, but rather are to be accorded the widest scope consistent with the disclosure.

Overview

Embodiments of this disclosure provide a system and method for facilitating enhanced annotation of training samples for autonomous driving applications. More specifically, to facilitate the accurate annotation of a busy traffic scene that may include objects occluding each other or faraway objects, a distributed data-collection system can include a mobile data-collection subsystem and one or more stationary data-collection subsystems. The mobile data-collection subsystem can include a plurality of sensors mounted on a vehicle and can be configured to collect data about a traffic scene while the vehicle is in motion. A stationary data-collection subsystem can include at least a lidar unit positioned above the vehicle level to collect 3D point clouds of objects in the traffic scene. The distributed data-collection system can further include an alignment subsystem configured to align the data collected by the mobile and stationary subsystems such that the collected data can be superimposed to increase the density of the point cloud of a small or faraway object, thus facilitating more accurate annotation.

Roadside Sensors

The ability to detect faraway objects (e.g., cars, obstacles, traffic signs, etc.) can be very important for an autonomous driving system because the timely detection of faraway traffic hazards can provide more time for the autonomous driving system to react. Training the autonomous driving system to recognize faraway objects requires a vast amount of labeled training data. However, annotating or labeling faraway objects in the training samples can be challenging.

Figure 1A:
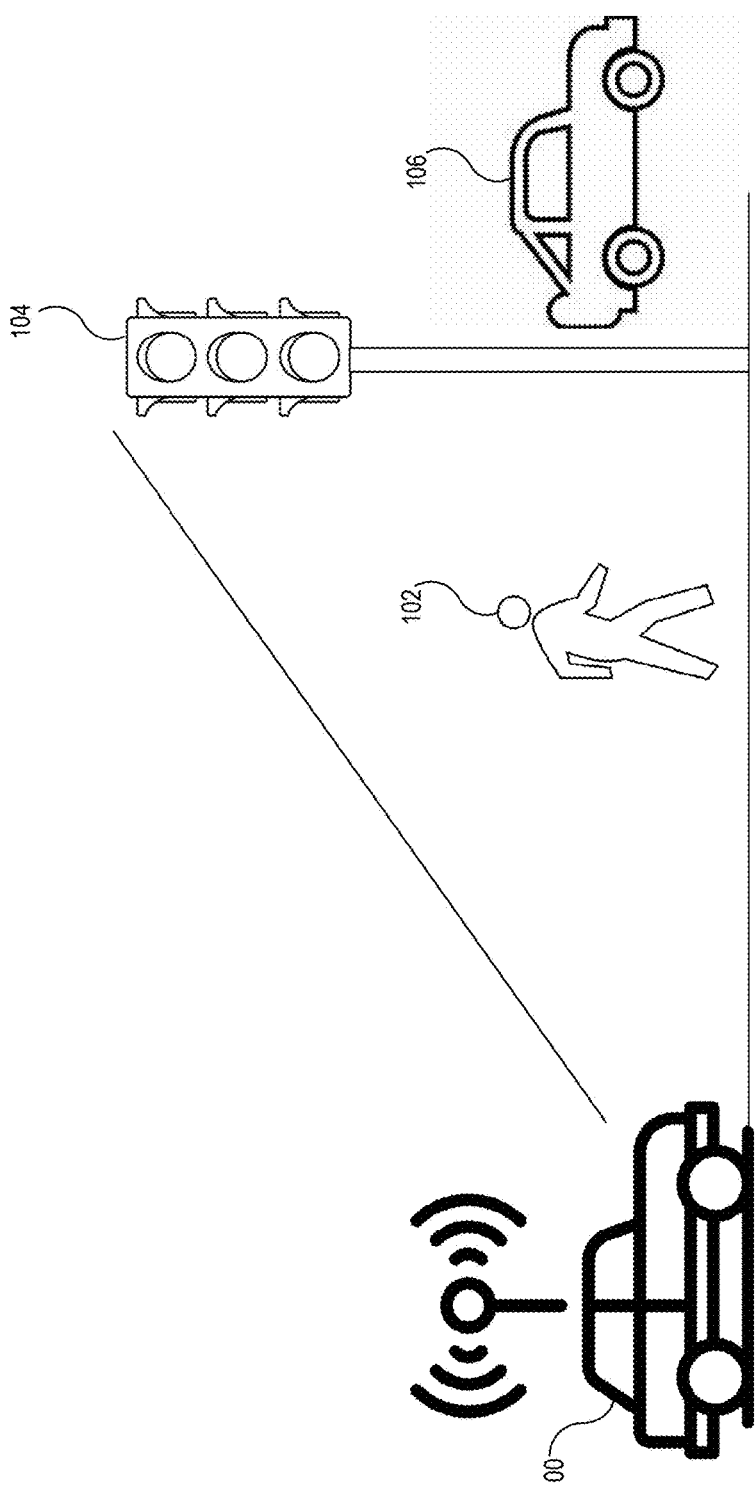
FIG. 1A illustrates an exemplary data-collection scenario, according to prior art.

FIG. 1A illustrates an exemplary data-collection scenario, according to prior art. In FIG. 1A, a specifically designed data-collection vehicle 100 can be equipped with a number of sensors, including but not limited to cameras, radars, lidar units (or lidars for short), GPS modules, etc. To collect traffic data, vehicle 100 can be deployed under various road and weather conditions. While vehicle 100 is in motion, the various sensors can collect data (e.g., images, 3D point clouds, etc.) about its surroundings, such as pedestrian 102, traffic light 104, car 106, etc.

Figure 1B:
FIG. 1B illustrates an example of an annotated image, according to prior art.
Figure 1C:
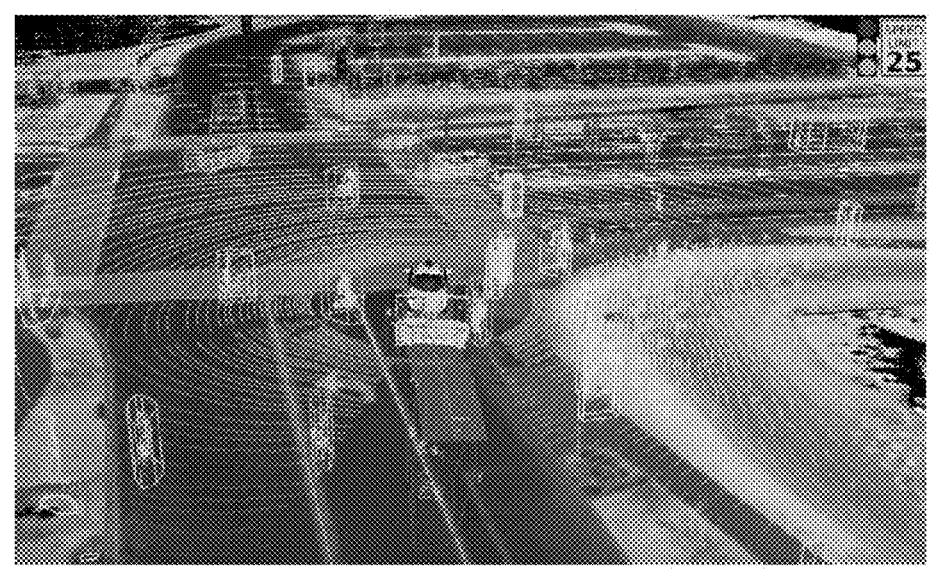
FIG. 1C illustrates an example of an annotated lidar frame, according to prior art.

The collected data can be annotated automatically (e.g., by various object-detection algorithms) or manually. FIG. 1B illustrates an example of an annotated image, according to prior art. As can be seen in FIG. 1B, faraway objects (e.g., cars) can be small and occluded by objects closer to the camera. It is very challenging for algorithms and humans to detect faraway objects accurately. FIG. 1C illustrates an example of an annotated lidar frame, according to prior art. As can be seen from FIG. 1C, the density of the point cloud for each detected object decreases as the distance between the object and the laser increases. The increased sparsity of the point clouds for faraway objects makes it harder to distinguish object shapes from each other, even for human annotators.

One existing approach to improving the annotation accuracy of faraway objects in collected data (e.g., images or 3D point clouds) can include using two data-collection vehicles, one following the other. The lidar unit (or lidar for short) on the front data-collection vehicle can collect light bouncing off faraway objects, thus providing and enhancement to 3D point clouds of those faraway objects. However, this approach requires carefully maintaining the distance between two moving vehicles, which can be a cumbersome process, and deploying the additional data-collection vehicle can be expensive and labor-intensive. Moreover, sensors (e.g., on cameras and lidars) on the front vehicle may suffer from the same occlusion problem, as their viewing angle is at the vehicle level.

To enhance the point clouds of the faraway objects, in some embodiments of the instant application, in addition to lidars installed on a moving data-collection vehicle, the data-collection system can include one or more additional stationary lidars positioned high above the traffic scene to collect light bouncing off faraway objects. More specifically, the stationary lidars can be closer to a target object than the lidars on the data-collection vehicle, thus capable of providing more information (e.g., computing more points) regarding the target object. Moreover, because the stationary lidars can be positioned high, they can provide an elevated view of target objects on the road, thus mitigating the occlusion problem facing sensors on the data-collection vehicle.

In some embodiments, the stationary lidars can be mounted on permanent roadside traffic structures (e.g., on posts supporting traffic lights or signs). For example, an intersection may include multiple traffic lights, with a stationary lidar mounted on each light post. In alternative embodiments, the stationary lidars can be portable. In one example, the stationary lidars can be carried by a vehicle parking at an overpass to scan traffic under the overpass. In another example, the stationary lidar can be mounted on top of a post carried by a vehicle parking on the roadside, scanning passing-by traffic.

Figure 2:
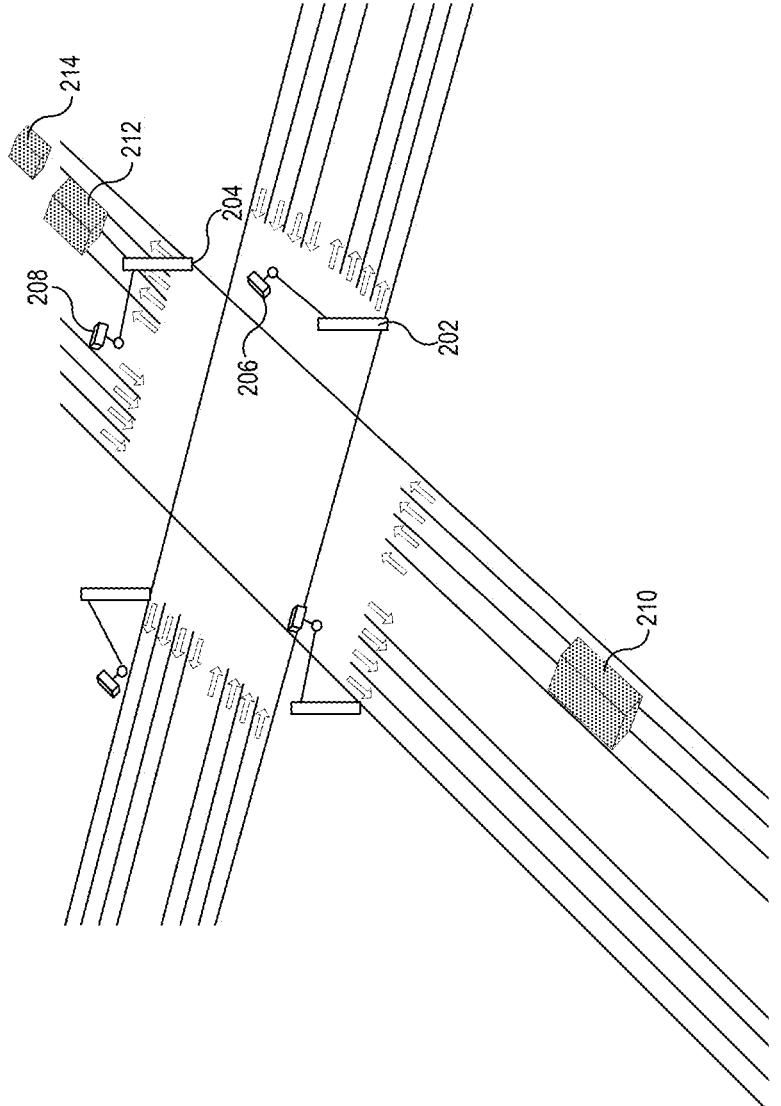
FIG. 2 illustrates an exemplary scenario of using roadside sensors to enhance 3D point clouds of faraway objects, according to one embodiment of the instant application.

FIG. 2 illustrates an exemplary scenario of using roadside sensors to enhance 3D point clouds of faraway objects, according to one embodiment of the instant application. In FIG. 2, a number of light/sensor supporting structures (e.g., posts) can be located around an intersection 200. In this example, each corner of intersection 200 can include a supporting structure (e.g., supporting structure 202 is located at the lower right corner of intersection 200, and supporting structure 204 is located at the upper right corner). A typical supporting structure can include a post and a cantilever, with traffic lights or signs attached to the cantilever. In many modern cities, other types of sensors (e.g., cameras, radars, etc.) may also be mounted on or attached to a cantilever to collect essential traffic information.

In some embodiments of the instant application, at least one lidar can be mounted on the cantilever of each of the supporting structures. For example, a lidar 206 can be mounted on supporting structure 202, and a lidar 208 can be mounted on supporting structure 204. In alternative embodiments, not all supporting structures have lidars installed. One or two lidars may be able to perform scans in all directions.

FIG. 2 also shows a data-collection vehicle 210 driving on the road. As discussed previously, various sensors can be installed on data-collection vehicle 210 to collect data (e.g., images, point clouds, etc.) about traffic scenes surrounding data-collection vehicle 210. For example, a camera installed on data-collection vehicle 210 can capture images of vehicles 212 and 214 driving in front of data-collection vehicle 210. Similarly, a lidar installed on data-collection vehicle 210 can obtain 3D point clouds of vehicles 212 and 214. As can be seen from FIG. 2, vehicle 214 is in front of vehicle 212 and is smaller than vehicle 212, which means that vehicle 214 may be partially blocked by vehicle 212 in those captured images. Moreover, both vehicles are far away from data-collection vehicle 210, meaning that their 3D point clouds collected by a lidar on data-collection vehicle 210 can be sparse. Both scenarios can cause difficulty in the annotation (even if done manually) of the collected data regarding vehicle 214.

To improve the annotation accuracy, in some embodiments, at least one roadside lidar mounted on the supporting structures (e.g., lidar 206 or 208) can also be used to scan the traffic scene to obtain the point clouds of target objects in the scene, including vehicles 212 and 214. Note that, because roadside lidars 206 and 208 are positioned above the traffic scene with an elevated viewing angle, they are less likely to face the occlusion problem. For example, when viewed from above, vehicle 212 will not block vehicle 214. Moreover, compared with data-collection vehicle 210, a roadside lidar (e.g., lidar 206 or 208) is closer to the target objects (e.g., vehicles 212 and 214), meaning that the point clouds obtained by the roadside lidar can have a higher density than the point clouds obtained by the lidar on data-collection vehicle 210. In some embodiments, the point clouds obtained by the roadside lidar can be combined with the point clouds obtained by the lidar on data-collection vehicle 210 to increase the density of the point clouds of the objects far away from data-collection vehicle 210 (e.g., vehicles 212 and 214 in FIG. 2).

In the example shown in FIG. 2, the roadside lidars are mounted on traffic lights near an intersection. In practice, such lidars can be mounted on any existing roadside traffic structures, such as streetlights, road signs, etc. Depending on the practical scenario, it may also be possible to mount the roadside lidars on buildings, trees, overpasses, etc. In smart street or smart highway scenarios, there can be dedicated roadside sensor-mounting structures equipped with lidars. In addition to being mounted on permanent traffic structures, the roadside lidars can also be portable, such as being carried by vehicles parked at selected locations. It is important that these roadside lidars be positioned higher than the traffic scene to mitigate the occlusion problem.

In the examples shown in FIG. 2, data-collection vehicle 210 is driving on the road, approaching intersection 200. In practice, it is also possible to have data-collection vehicle 210 parking on the side of the road to collect data about traffic (e.g., vehicles, pedestrians, etc.) passing through intersection 200. In one example, data-collection vehicle 210 may park at a location far away (e.g., at a distance between 150 and 250 meters) from intersection 200. In such a scenario, roadside lidars (e.g., lidars 206 and 208) can scan vehicles/pedestrians near intersection 200 from above to obtain high-precision points clouds of these objects. This way, data-collection vehicle 210 can collect training samples that include data (e.g., point clouds) regarding the faraway objects, and the roadside lidars can provide an enhancement to such data.

In some embodiments, in addition to lidars (e.g., lidars 206 and 208), one or more cameras can also be mounted on the roadside supporting structures (e.g., structures 202 and 204) to provide additional visual information (e.g., images) of the traffic scene. Such visual information can also be combined with the visual information collected by data-collection vehicle 210 to improve the annotation accuracy of the collected traffic data. Note that, compared with the roadside lidars that can provide high-precision 3D point clouds of faraway objects, the roadside cameras often can only qualitatively, not quantitively, enhance the collected data (e.g., images or 3D point clouds). In addition, the use of cameras may raise privacy concerns and may sometimes be unavailable.

Data Merging

The additional data collected by the roadside sensors (e.g., lidars and/or cameras) can be merged with the data collected by sensors on the data-collection vehicle to obtain enhanced data (e.g., point clouds). Before merging data from different lidars, the different sets of data should be aligned in both the time and spatial domains. Aligning data from different sensors in the time domain can be relatively easy as long as all sensors are synchronized. In some embodiments, all lidars may rely on the same clock source (e.g., a GPS-supplied clock) to trigger the laser pulses. The offset in time between different lidars can be less than 0.05 seconds.

Aligning data from different sensors in the spatial domain can be more complex. Note that the instant relative pose between a lidar and a target object can determine the instant pose of the 3D point cloud of the target object. More specifically, the 3D point cloud of the target object collected by a lidar at a certain time instant is often represented using a coordinate system local to the lidar at that time instant. As the lidar moves or changes its pose (e.g., along with the vehicle carrying the lidar), the local coordinate system changes. Similarly, different lidars with different poses can have different local coordinate systems. Before data represented using different coordinate systems can be merged, they should be converted (or transformed) into the same coordinate system.

In some embodiments, a reference coordinate system can be selected, and all point clouds (including point clouds from the same lidar at different time instants and point clouds from different lidars) can be aligned to the reference coordinate system. Various point-cloud-alignment algorithms can be used to align the point clouds from different coordinate systems. In one embodiment, the Iterative Closest Point (ICP) algorithm can be used to align the point clouds. Note that the reference coordinate system can be selected arbitrarily. In one embodiment, the reference coordinate system can be determined based on the first frame captured by the vehicle-mounted lidar (i.e., the lidar mounted on the data-collection vehicle). Such a frame can also be referred to as the reference frame. For example, the origin of the reference coordinate system can be a predetermined point on the on-vehicle lidar when it captures the first frame. The absolution position of such a predetermined point (i.e., its position in the world coordinate system) can be determined by the precise GPS module (e.g., a real-time kinematic positioning (RTK) GPS module) mounted on the data-collection vehicle. In other words, all subsequent frames obtained by the on-vehicle lidar and frames obtained by the roadside lidars can be aligned according to the reference frame.

Once the reference coordinate system is determined, other frames (including the frames captured by the same on-vehicle lidar at different time instants and the frames captured by roadside lidars) can be aligned to the reference coordinate system. More specifically, a transformation matrix can be derived for each frame such that point clouds in each frame can be transformed from the local coordinate system to the reference coordinate system.

When the lidar scans a busy traffic scene (e.g., a traffic scene at an intersection), each obtained frame may include the point clouds of many different objects, thus making it difficult to align the frames to the reference coordinate system. To simplify the alignment process, in some embodiments, before aligning a particular frame to the reference coordinate system, the system can remove transitory objects (e.g., vehicles and pedestrians) from the frame. The resulting frame can be simpler and may include easy-to-detect or easy-to-recognize objects (e.g., landmarks, lane lines, curbs, etc.). The simplified frame can be aligned to the reference coordinate system (e.g., by applying the ICP algorithm) to obtain the pose of the lidar in the reference coordinate system at the time instant it captures the frame. Such a pose can be referred to as an instant local pose. Because the on-vehicle lidar moves along with the vehicle, each captured frame corresponds to a different instant local pose. On the other hand, a roadside lidar is stationary, meaning that its pose in the reference coordinate system remains unchanged and can be simply referred to as a local pose. In some embodiments, the local pose of the roadside lidar can be determined from an arbitrary frame (e.g., the first frame).

In one embodiment, after aligning a plurality of subsequent simplified frames captured by the on-vehicle lidar, the system can superimpose the plurality of aligned simplified frames to create a high-precision local map. This high-precision local map can indicate the locations of non-transitory objects, such as lane lines, curbs, crosswalks, etc. In addition to creating the map, for each simplified frame, the system can determine a corresponding transformation matrix. The transformation matrix can be used to convert point clouds of objects (e.g., vehicles, pedestrians, etc.) from the vehicle-based coordinate system to the reference coordinate system such that the point cloud of a particular object can be aligned to the corresponding point cloud in the reference frame.

A data-collection vehicle typically can be equipped with multiple lidars, each scanning the traffic scene from a different viewing angle. In some embodiments, data (i.e., point clouds) collected by each on-vehicle lidar can be enhanced by the data (i.e., point clouds) collected by the roadside sensor(s). For example, a transformation matrix can be derived for each on-vehicle lidar, and a frame obtained by the roadside lidar can be aligned to different reference coordinate systems corresponding to the different on-vehicle lidars.

In some embodiments, enhancing the point cloud of a particular object in an arbitrary frame (i.e., an arbitrary time instant) obtained by the on-vehicle lidar can include multiple data matching and merging operations. For example, the system can first identify a corresponding frame (e.g., based on the timestamp) obtained by the roadside lidar, and then detect (e.g., by using an object detection technique) a corresponding point cloud in the roadside frame. The system can further align the point cloud obtained by the roadside lidar to the point cloud obtained by the on-vehicle lidar. Note that the instant local pose of the on-vehicle lidar and the local pose of the roadside lidar have been previously determined, and the point clouds can be aligned based on the transformation matrix corresponding to the two poses. In one example, a transformation matrix between the two poses can be computed, and the point cloud can be converted from one pose to the other based on the computed transformation matrix.

Subsequent to the alignment, the point cloud obtained by the roadside lidar can be superimposed onto the point cloud obtained by the on-vehicle lidar to create an enhanced point cloud. Note that although more than one object's point cloud in a given frame can be enhanced, the enhancement to point clouds of small or faraway objects can be more impactful due to the sparsity of these point clouds. The frame with the enhanced point clouds can then be annotated and used for training purposes. The annotation of frames with enhanced point clouds can be much more accurate and can provide more data compared with the frames without point cloud enhancement. In an extreme case, an unrecognizable faraway object may become recognizable after its point cloud is enhanced.

Figure 3:
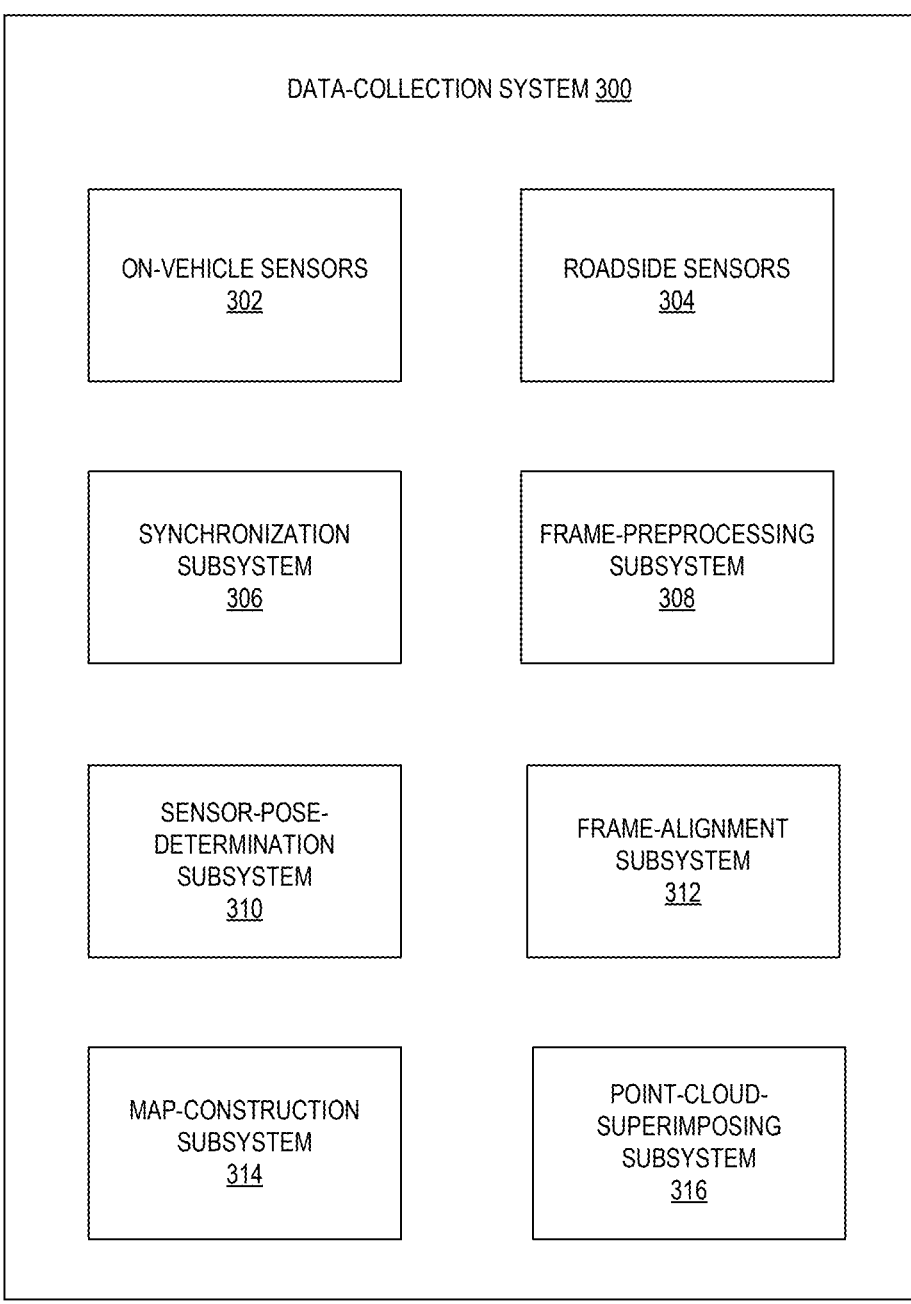
FIG. 3 illustrates an exemplary block diagram of a data-collection system, according to one embodiment of the instant application.

FIG. 3 illustrates an exemplary block diagram of a data-collection system, according to one embodiment of the instant application. Data-collection system 300 can include a number of on-vehicle sensors 302, a number of roadside sensors 304, a synchronization subsystem 306, a frame-preprocessing subsystem system 308, a sensor-pose-determination subsystem 310, a frame-alignment subsystem 312, a map-construction subsystem 314, and a point-cloud-superimposing subsystem 316.

On-vehicle sensors 302 can include various sensors carried by a data-collection vehicle. In one example, on-vehicle sensors 302 can include one or more cameras, one or more lidars, a GPS module, an inertial measurement unit (IMU), etc. On-vehicle sensors 302 can collect data while the vehicle is in motion or while it is parked. In most cases, the on-vehicle cameras and lidars can have a viewing angle that is not elevated (e.g., at the vehicle level).

Roadside sensors 304 can include various sensors mounted on roadside traffic structures (e.g., light posts, traffic signs, overpasses, etc.), buildings, or trees. Roadside sensors 304 are stationary. In one example, roadside sensors 304 can include cameras, lidars, and/or a GPS module. The roadside cameras and lidars typically can have an elevated viewing angle. In one embodiment, each lidar can operate at a speed of about 10 Hz or capture about 10 frames per second.

Synchronization subsystem 306 can be responsible for synchronizing the data captured by the different sensors to facilitate data merging. For example, before a frame obtained by a roadside lidar can be merged with a frame obtained by an on-vehicle lidar, synchronization subsystem 306 can be used to determine that these two frames are obtained at the same instant, meaning they represent the same traffic scene. In some embodiments, synchronization subsystem 306 can interface with the GPS modules within on-vehicle sensors 302 and roadside sensors 304 to obtain the timing information of each frame. The obtained timing information can then be used to align the frames from different sensors in the time domain. In some embodiments, on-vehicle sensors 302 and roadside sensors 304 can be triggered by the same high-precision GPS signal. For example, an on-vehicle lidar and a roadside lidar can operate in sync, such that each time the on-vehicle lidar captures a frame, the roadside lidar captures a frame simultaneously.

Frame-preprocessing subsystem system 308 can be responsible for preprocessing the frames obtained by the different lidars, including the on-vehicle lidars and the roadside lidars. Frame-preprocessing subsystem system 308 can remove, from each frame, transitory objects (e.g., vehicles, pedestrians, etc.). A preprocessed frame can include objects that are easily recognizable, such as landmarks, curbs, lane lines, etc.

Sensor-pose-determination subsystem 310 can be responsible for determining the pose (respective of a reference coordinate system) of the camera or lidar corresponding to each frame (i.e., the instant pose of the camera or lidar capturing the frame). In some embodiments, sensor-pose-determination subsystem 310 can obtain instant GPS information to determine the sensor pose. In alternative embodiments, sensor-pose-determination subsystem 310 can determine the instant pose of a lidar by aligning the corresponding preprocessed frame to a reference frame (e.g., the first frame captured by the on-vehicle lidar). When a lidar is in motion (e.g., moving along with the data-collection vehicle), the pose of the lidar in each frame can also be determined in iterations. For example, the pose of the lidar in a particular frame can be determined by aligning the particular frame to a frame of a previous time instant. Because the roadside sensors are stationary, only one iteration is needed to determine the pose of each roadside sensor. For example, sensor-pose-determination subsystem 310 can align an arbitrary preprocessed frame of the roadside lidar with the reference frame to determine the pose of the roadside lidar.

Frame-alignment subsystem 312 can be used to align, in the spatial domain, frames captured by sensors of different poses. The alignment can allow the point cloud of an object in one frame to overlap with the point cloud of the same object in another frame. In some embodiments, frame-alignment subsystem 312 can use the ICP algorithm to align the frames. Frame-alignment subsystem 312 can also compute a transformation matrix that can be used to transform a frame from one sensor pose to another. In addition to aligning the frames in the spatial domain, in some embodiments, frame-alignment subsystem 312 can also align, in the time domain, corresponding frames captured by different sensors based on the output of synchronization subsystem 306. For example, frames captured by different lidars can be aligned in the time domain based on the timestamp associated with each frame.

Map-construction subsystem 314 can be used to construct a high-precision map based on aligned preprocessed frames from the on-vehicle lidars. Because the preprocessed frames do not include transitory (or time-varying) objects, after being aligned to the same coordinate system, these preprocessed frames represent an identical scene (e.g., an intersection, a particular section of a street or highway, etc.). Therefore, superimposing these aligned preprocessed frames can provide detailed information (e.g., locations of the lane lines and curbs) about the scene. The reconstructed maps can be used as training data for training an autonomous driving system.

Point-cloud-superimposing subsystem 316 can be used to superimpose the point cloud of an object obtained by the roadside lidar (also referred to as a roadside point cloud) to the corresponding point cloud obtained by the on-vehicle lidar (also referred to as an on-vehicle point cloud). Before superimposing the point clouds, the frames or point clouds should be aligned in both the time domain and the spatial domain. In one embodiment, point-cloud-superimposing subsystem 316 can identify frames that are aligned in the time domain (e.g., frames captured at the same time instant) and determine the instant poses of the lidars capturing those frames. Point-cloud-superimposing subsystem 316 can further compute a transformation matrix between the two poses. The transformation matrix can be used to convert a point cloud from one coordinate system to another coordinate system. For example, point-cloud-superimposing subsystem 316 can apply the transformation matrix on a roadside point cloud to align it to the corresponding on-vehicle point cloud. The aligned roadside point cloud can then be superimposed onto the corresponding on-vehicle point cloud to provide enhancement to the on-vehicle point cloud.

Figure 4:
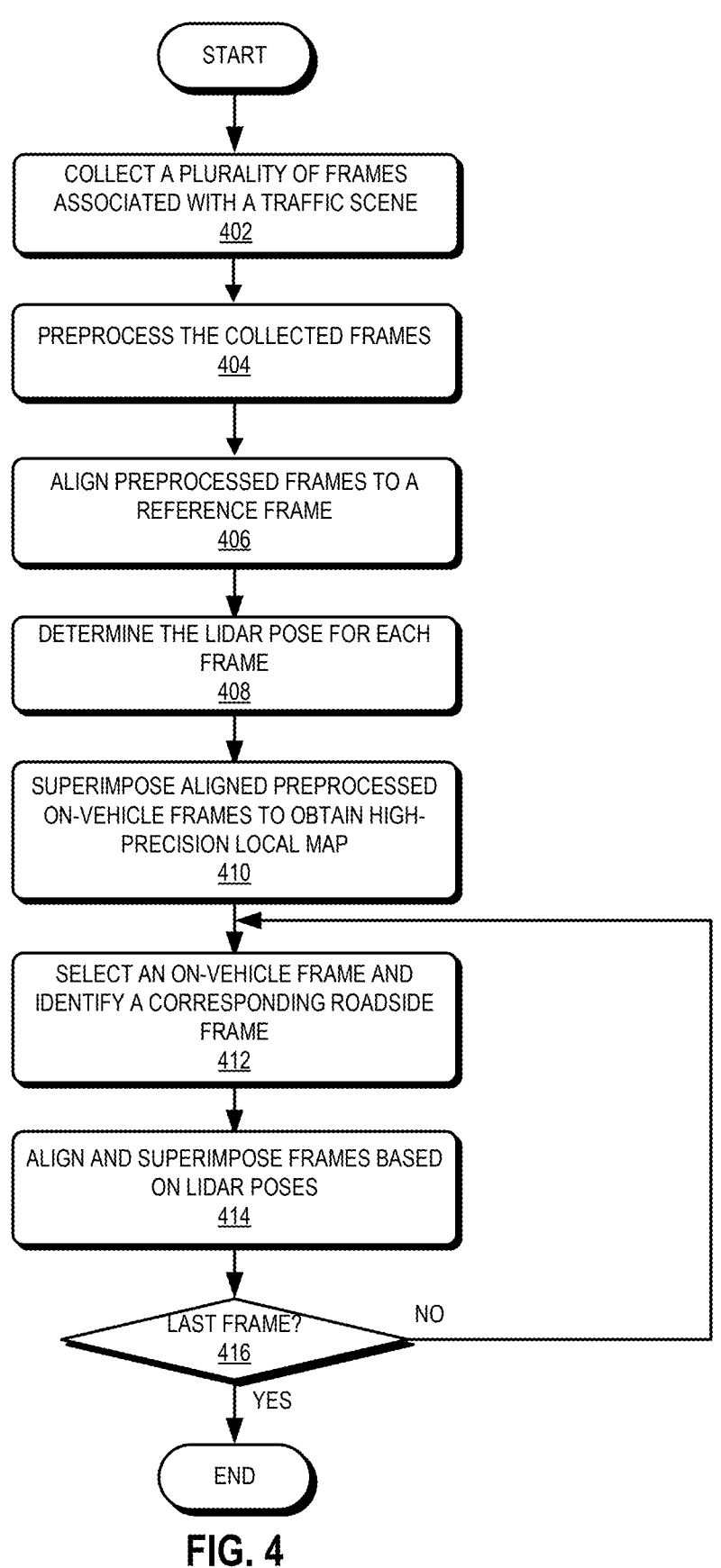
FIG. 4 presents a flowchart illustrating an exemplary data-collection and point-cloud-enhancement process, according to one embodiment of the instant application.

FIG. 4 presents a flowchart illustrating an exemplary data-collection and point-cloud-enhancement process, according to one embodiment of the instant application. In one or more embodiments, one or more of the steps in FIG. 4 may be repeated and/or performed in a different order. Accordingly, the specific arrangement of steps shown in FIG. 4 should not be construed as limiting the scope of the technique.

During operation, a distributed data-collection system comprising multiple lidars can collect a plurality of frames associated with a dynamic traffic scene (operation 402). In some embodiments, the distributed data-collection system can include at least one lidar mounted on a data-collection vehicle and one lidar mounted on a roadside structure, with each lidar collecting a continuous stream of frames. In one example, the on-vehicle lidar can move along with the data-collection vehicle, and the continuous stream of frames can be collected as the data-collection vehicle approaches the roadside lidar from a faraway location. In this example, objects near the roadside lidar can appear as faraway objects in initial frames collected by the on-vehicle lidar. The frames collected by each lidar can be processed locally (e.g., by a computing device within the data-collection vehicle) or sent to a centralized location for processing. In some embodiments, the centralized location can be a processing unit within the data-collection vehicle. More specifically, the roadside lidar can transmit (e.g., via a wireless network) its collected frames to the processing unit. In alternative embodiments, the centralized location can be a remote server, and both the on-vehicle lidar and the roadside lidar can transmit their frames to the remote server.

Each of the collected lidar frames can be preprocessed (operation 404). In some embodiments, preprocessing a lidar frame can include removing transitory objects (i.e., objects may change locations with time) from the frame. For example, non-map objects such as vehicles and pedestrians can be removed from the frames, leaving objects that are part of the map (e.g., buildings, traffic markings, curbs, etc.) in the frame.

The preprocessed frames (including the frames collected by the on-vehicle lidar and the frames collected by the roadside lidar) can then be aligned to a reference frame (operation 406). The reference frame can be selected arbitrarily from the frames captured by the on-vehicle lidar. Once the reference frame is selected, a reference coordinate system can be determined accordingly. In one example, the reference frame can be the first frame in the stream of frames obtained by the on-vehicle lidar, and the reference coordinate system can be anchored to the on-vehicle lidar. In some embodiments, the frame alignment can be performed based on high-precision GPS data associated with each frame. For example, based on the timestamp on each frame, the system can identify the instant GPS reading of the data-collection vehicle and then determine the pose of the on-vehicle lidar. The relative position between the on-vehicle lidar and the data-collection vehicle typically remains unchanged. In alternative embodiments, the frame alignment can be performed using an ICP algorithm. In a further embodiment, each frame can be aligned to a frame of a previous time instant using the ICP algorithm. Because the pose of the on-vehicle lidar changes slightly between consecutive frames, applying the ICP algorithm on consecutive frames can result in a high-accuracy alignment. Because the roadside lidar does not move, the alignment between frames captured by the roadside lidar and the reference frame can be done by selecting any roadside frame and aligning the selected roadside frame to the reference frame. Once the selected frame is aligned, other roadside frames can be similarly aligned.

The pose of the lidar associated with each frame can then be determined based on the frame alignment result (operation 408). As discussed before, the pose of the on-vehicle lidar changes continuously as the data-collection vehicle moves, whereas the pose of the roadside lidar remains unchanged. Therefore, each frame captured by the on-vehicle lidar corresponds to a different lidar pose, whereas all frames captured by the roadside lidar correspond to the same lidar pose.

The system can superimpose the aligned preprocessed frames captured by the on-vehicle lidar to obtain a high-precision local map (operation 410). Such a high-precision local map can be part of the training data.

The system can select an on-vehicle frame (i.e., a frame captured by the on-vehicle lidar) and identify a corresponding time-aligned roadside frame (i.e., a frame captured by the roadside lidar at the same time instant) (operation 412). The system can then align and superimpose the two frames (i.e., the selected on-vehicle frame and the identified time-aligned roadside frame) according to the lidar poses corresponding to the two frames (operation 414). Note that both frames include transitory objects (e.g., vehicles, pedestrians, etc.). Because they are captured at the same instant, the poses of the objects should be the same in the same coordinate system (e.g., the local reference coordinate system). Aligning the frames also means that the 3D point cloud of a particular object in one frame can be aligned to the 3D point cloud of the same object in another frame. Superimposing the roadside frame onto the on-vehicle frame can result in the enhancement of 3D point clouds of the objects, and such enhancement can be more impactful for objects that are small or far away from the on-vehicle lidar.

The system can then determine whether the current frame is the last one in the continuous stream of frames captured by the on-vehicle lidar (operation 416). If not, a subsequent frame can be selected (operation 412). Otherwise, the process ends. Note that in the example shown in FIG. 4, superimposing frames from the two lidars can be done sequentially in a frame-by-frame fashion. In practice, such an operation can also be performed in parallel. After the enhancement of the point clouds, the continuous stream of frames captured by the on-vehicle lidar can be sent for annotation. With the enhancement, the point clouds of small or faraway objects are less sparse, thus making it easier for a human annotator or an algorithm to annotate such objects.

Figure 5:
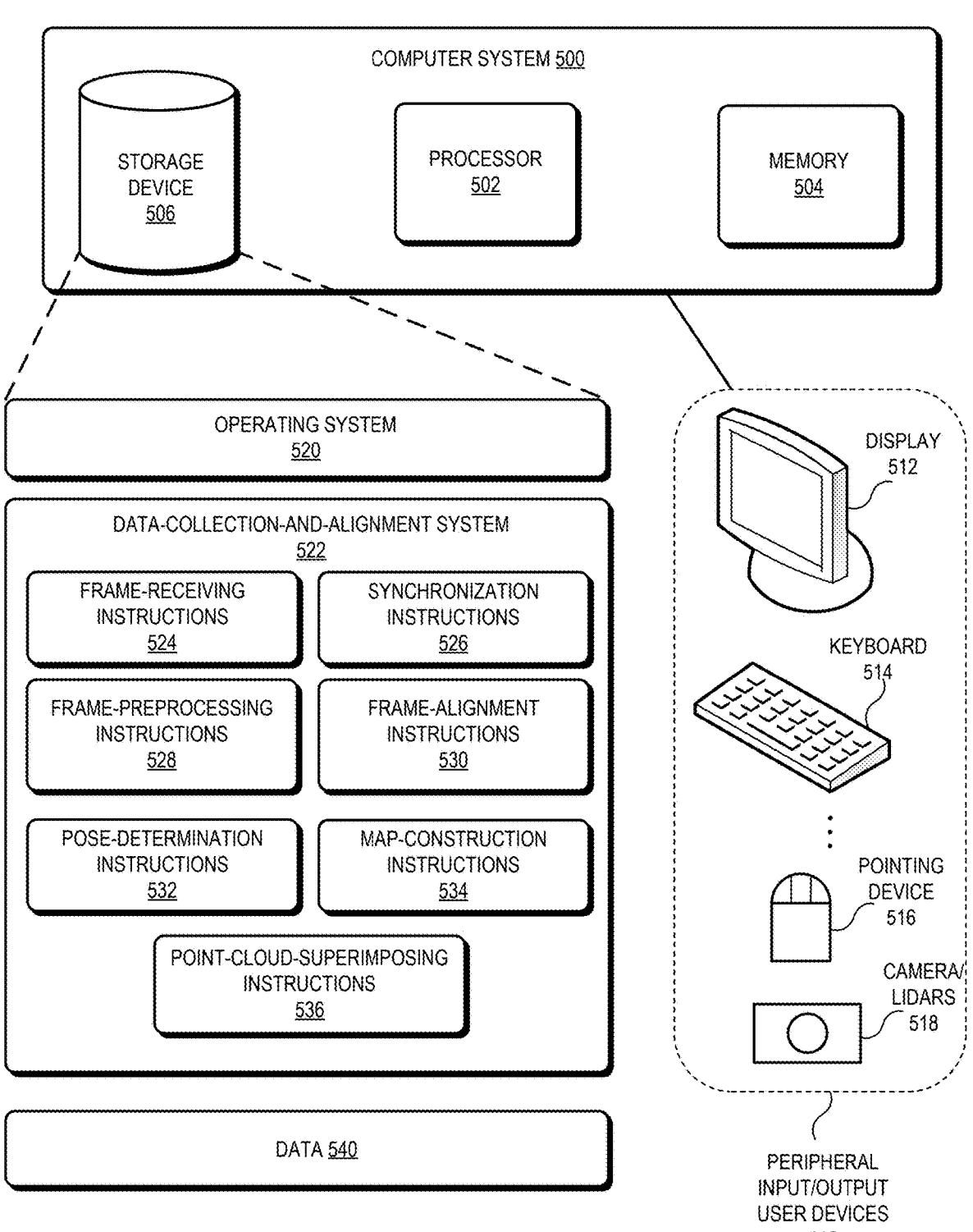
FIG. 5 illustrates an exemplary computer system, according to one embodiment of the instant application.

FIG. 5 illustrates an exemplary computer system, according to one embodiment of the instant application. Computer system 500 includes a processor 502, a memory 504, and a storage device 506. Furthermore, computer system 500 can be coupled to peripheral input/output (I/O) user devices 510, e.g., a display device 512, a keyboard 514, a pointing device 516, and cameras/lidars 518. Storage device 506 can store an operating system 520, a data-collection-and-alignment system 522, and data 540. In some embodiments, computer system 500 can be implemented as part of the sample-collection system for autonomous driving.

Data-collection-and-alignment system 522 can include instructions, which when executed by computer system 500, can cause computer system 500 or processor 502 to perform methods and/or processes described in this disclosure. Specifically, data-collection-and-alignment system 522 can include instructions for receiving frames collected by multiple lidars (frame-receiving instructions 524), instructions for synchronizing the lidars (synchronization instructions 526), instructions for preprocessing the lidar frames (frame-preprocessing instructions 528), instructions for aligning the preprocessed lidar frames (frame-alignment instructions 530), instructions for determining the lidar pose associated with each frame (pose-determination instructions 532), instructions for constructing a high-precision local map based on aligned preprocessed frames (map-construction instructions 534), and instructions for superimposing point clouds of time and space aligned frames (point-cloud-superimposing instructions 536).

This disclosure presents a solution to the annotation problem associated with small and faraway objects in lidar frames due to the sparsity of the point clouds of these objects. More specifically, a distributed data-collection system comprising both on-vehicle sensors and roadside sensors can be used to simultaneously collect data associated with a traffic scene. The distributed data-collection system can include one or more on-vehicle lidars and at least a roadside lidar with an elevated view of the traffic scene. The pose of the lidar associated with each frame can be determined based on GPS data or by aligning non-transitory objects in the lidar frames using the ICP algorithm. The frames from an on-vehicle lidar and a roadside lidar can be aligned in time and space, and corresponding time-and-space-aligned frames can be superimposed, thus enhancing the point clouds of objects (especially small and faraway objects) in each on-vehicle frame. The frames with enhanced point clouds can be easily annotated and used as training samples for autonomous driving.

Data structures and program code described in this detailed description are typically stored on a non-transitory computer-readable storage medium, which may be any device or medium that can store code and/or data for use by a computer system. Non-transitory computer-readable storage media include, but are not limited to, volatile memory; non-volatile memory; electrical, magnetic, and optical storage devices, solid-state drives, and/or other non-transitory computer-readable media now known or later developed.

Methods and processes described in the detailed description can be embodied as code and/or data, which may be stored in a non-transitory computer-readable storage medium as described above. When a processor or computer system reads and executes the code and manipulates the data stored on the medium, the processor or computer system performs the methods and processes embodied as code and data structures and stored within the medium.

Furthermore, the optimized parameters from the methods and processes may be programmed into hardware modules such as, but not limited to, application-specific integrated circuit (ASIC) chips, field-programmable gate arrays (FPGAs), and other programmable-logic devices now known or hereafter developed. When such a hardware module is activated, it performs the methods and processes included within the module.

The foregoing embodiments have been presented for purposes of illustration and description only. They are not intended to be exhaustive or to limit this disclosure to the forms disclosed. Accordingly, many modifications and variations will be apparent to practitioners skilled in the art. The scope is defined by the appended claims, not the preceding disclosure.

What is claimed is:

1. A data-collection system for collecting training data for autonomous driving applications, the data-collection system comprising:

a first on-vehicle light-detection-and-ranging (lidar) mounted on a first data-collection vehicle and config- ured to collect a first stream of frames while the first data-collection vehicle is in motion;

a second on-vehicle lidar mounted on a second data- collection vehicle and positioned at a height above the first on-vehicle lidar, wherein the second on-vehicle lidar is configured to collect a second stream of frames while the second data-collection vehicle is stationary; and a computer system comprising a processor and a memory coupled to the processor and storing instructions that when executed by the processor cause the processor to perform a method for collecting training data for autonomous driving applications, wherein the method comprises:

aligning the second stream of frames collected by the second on-vehicle lidar to the first stream of frames collected by the first on-vehicle lidar in time and spatial domains; and superimposing a frame from the second stream of frames onto a corresponding frame from the first stream of frames, thereby facilitating enhancement of point clouds of objects in the first stream of frames;

wherein aligning the second stream of frames to the first stream of frames in the time and spatial domains comprises:

selecting a frame from the first stream of frames as a reference frame;

identifying a frame from the second stream of frames that is aligned to the selected frame in the time domain; and aligning, in the spatial domain, the identified frame to the selected frame based on a pose of the first on-vehicle lidar associated with the selected frame and a pose of the second on-vehicle lidar.

2. The data-collection system of claim 1, wherein the method further comprises synchronizing operations of the first on-vehicle lidar and the second on-vehicle lidar.

3. The data-collection system of claim 2, wherein syn- chronizing operations of the first on-vehicle lidar and the second on-vehicle lidar comprises using a same high-preci- sion Global Positioning System (GPS) module to trigger the operations of the first and second on-vehicle lidars.

4. The data-collection system of claim 1, further com- prising a pose-determination subsystem to determine a pose of the first on-vehicle lidar associated with each frame of the first stream of frames and a pose of the second on-vehicle lidar.

5. The data-collection system of claim 4, wherein the method further comprises preprocessing a frame by remov- ing transitory objects from the frame.

6. The data-collection system of claim 5, wherein the pose-determination subsystem determines the pose of the first on-vehicle lidar associated with a frame by aligning, in the spatial domain, the preprocessed frame to a reference frame; and wherein the pose-determination subsystem determines the pose of the second on-vehicle lidar by aligning, in the spatial domain, a frame selected from the second stream of frames to the reference frame.

7. The data-collection system of claim 6, wherein align- ing, in the spatial domain, the preprocessed frame to the reference frame comprises:

applying an Iterative Closest Point (ICP) algorithm; or obtaining high-precision GPS information associated with the first on-vehicle lidar and the second on-vehicle lidar.

8. The data-collection system of claim 6, further com- prising a map-construction subsystem to construct a high- precision map by superimposing preprocessed frames from the first stream of frames collected by the first on-vehicle lidar.

9. A method for collecting training data for autonomous driving applications, comprising:

obtaining a first stream of frames from a first on-vehicle light-detection-and-ranging (lidar) mounted on a first data-collection vehicle, wherein the first stream of frames is collected while the first data-collection vehicle is in motion;

obtaining a second stream of frames from a second on-vehicle lidar mounted on a second data-collection vehicle and positioned at a height above the first on-vehicle lidar, wherein the second stream of frames is collected while the second data-collection vehicle is stationary;

aligning the second stream of frames collected by the second on-vehicle lidar to the first stream of frames collected by first the on-vehicle lidar in time and spatial domains; and superimposing a frame from the second stream of frames onto a corresponding frame from the first stream of frames, thereby facilitating enhancement of point clouds of objects in the first stream of frames;

wherein aligning the second stream of frames to the first stream of frames in the time and spatial domains comprises:

selecting a frame from the first stream of frames as a reference frame;

identifying a frame from the second stream of frames that is aligned to the selected frame in the time domain; and aligning, in the spatial domain, the identified frame to the selected frame based on a pose of the first on-vehicle lidar associated with the selected frame and a pose of the second on-vehicle lidar.

10. The method of claim 9, further comprising synchro- nizing operations of the first and second on-vehicle lidars.

11. The method of claim 10, wherein the operations of the first and second on-vehicle lidars are triggered by a same high-precision Global Positioning System (GPS) signal.

12. The method of claim 9, further comprising determin- ing a pose of the first on-vehicle lidar associated with each frame of the first stream of frames and a pose of the second on-vehicle lidar.

13. The method of claim 12, further comprising prepro- cessing a frame by removing transitory objects from the frame.

14. The method of claim 13, wherein determining the pose of the first on-vehicle lidar associated with a frame comprises aligning, in the spatial domain, the preprocessed frame to a reference frame; and wherein determining the pose of the second on-vehicle lidar comprises aligning, in the spatial domain, a frame selected from the second stream of frames to the reference frame.

15. The method of claim 14, wherein aligning, in the spatial domain, the preprocessed frame to the reference frame comprises:

applying an Iterative Closest Point (ICP) algorithm; or obtaining high-precision GPS information associated with the first on-vehicle lidar and the second on-vehicle lidar.

16. The method of claim 14, further comprising constructing a high-precision map by superimposing preprocessed frames from the first stream of frames collected by the first on-vehicle lidar.

\*   \*   \*   \*   \*